(No Model.)  C. A. WILLIAMSON.  2 Sheets—Sheet 1.
SEAT FOR BICYCLES.
No. 364,075.  Patented May 31, 1887.
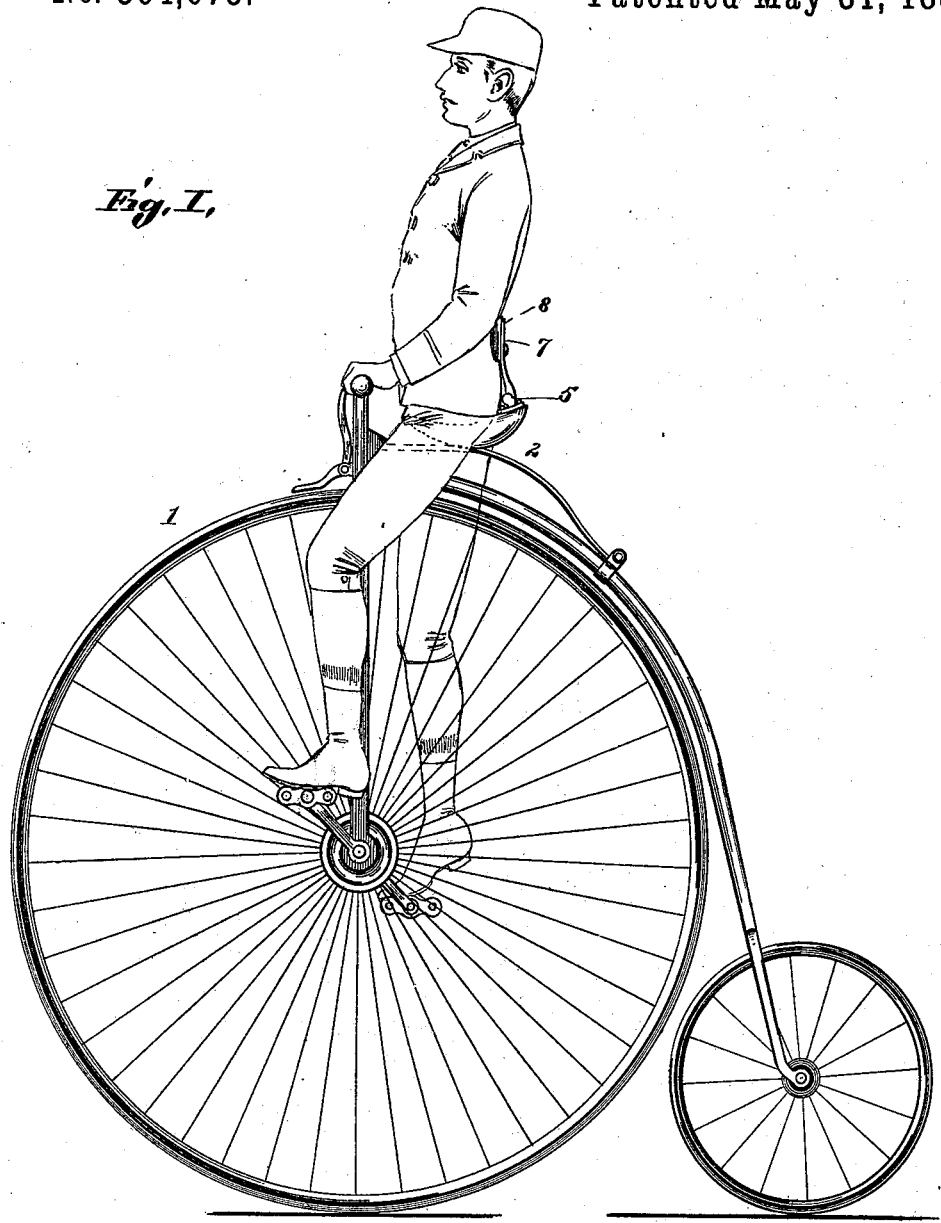
Fig. I.
Attest
G. N. Hinchman Jr.
Joseph Wahle
Inventor;
Catherine A. Williamson,
By Knight Bro
Attys.

(No Model.) 2 Sheets—Sheet 2.
C. A. WILLIAMSON.
SEAT FOR BICYCLES.
No. 364,075. Patented May 31, 1887.
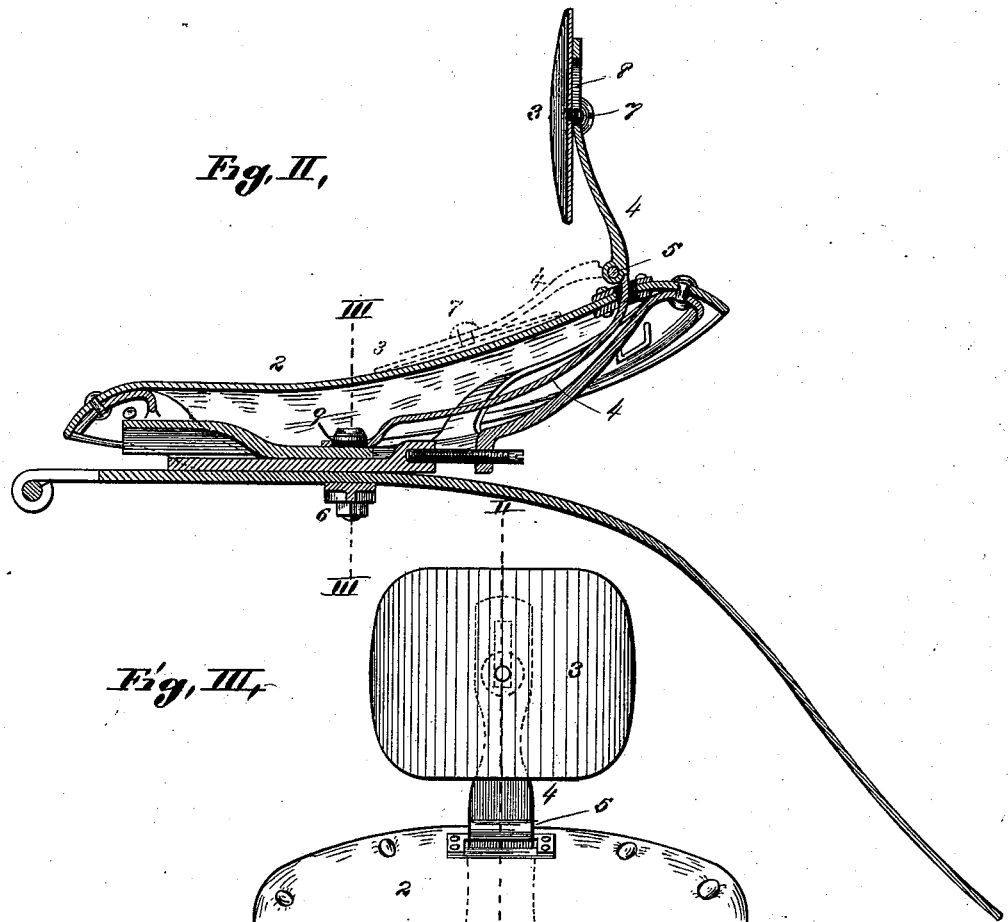
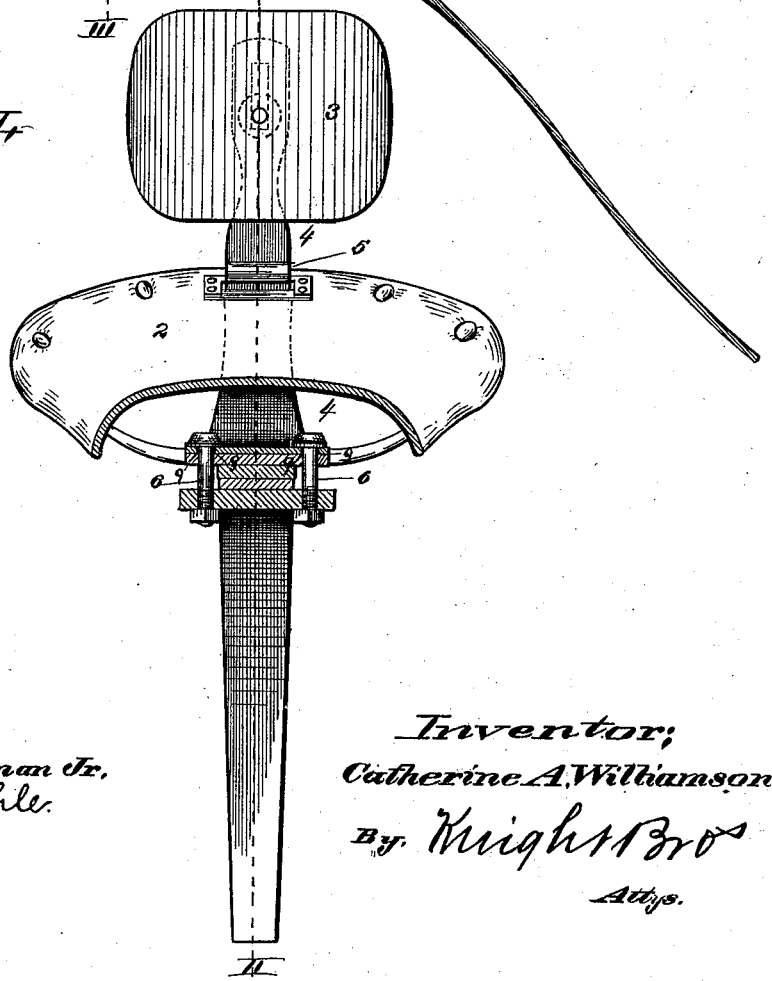
Attest:
G. N. Hinchman Jr.
Joseph Nahle.
Inventor:
Catherine A. Williamson.
By Knight Bros
Attys.

UNITED STATES PATENT OFFICE.

CATHERINE A. WILLIAMSON, OF ST. LOUIS, MISSOURI.

SEAT FOR BICYCLES.

SPECIFICATION forming part of Letters Patent No. 364,075, dated May 31, 1887.

Application filed January 10, 1887. Serial No. 223,884. (No model.)

*To all whom it may concern:*

Be it known that I, CATHERINE A. WILLIAMSON, of the city of St. Louis, in the State of Missouri, have invented certain new and useful Improvements in Seats for Bicycles, of which the following is a full, clear, and exact description, reference being had to the accompanying drawings, forming part of this specification, and in which—

Figure I is a side elevation of a bicycle embodying my improved seat. Fig. II is a longitudinal vertical section through the seat, taken on line II II, Fig. III. Fig. III is a transverse section taken on line III III, Fig. II.

My invention relates to a seat intended more particularly for bicycles of all kinds, but which may be used on other like machines—such, for instance, as tricycles; and my invention consists in features of novelty hereinafter fully described, and pointed out in the claim.

Referring to the drawings, 1 represents a bicycle of any ordinary construction, having a seat, 2, which may be in itself also of any ordinary construction.

3 represents a back-rest support, secured to the seat by means of an arm, 4, preferably formed in two parts, hinged together at 5 a little above the top of the seat. I have shown the arm secured to the seat by means of the ordinary bolts, 6, which pass through the lower end of the arm, as shown in Fig. II.

The object of forming the hinge 5 in the arm is to permit the support or rest to be folded down, as shown by dotted lines in Fig. II, when not in use, so as to be out of the way, without the danger of being broken or strained by coming in contact with any object or by the falling over of the machine.

The rest or support is secured to the arm preferably by means of a screw, 7, and this screw preferably passes through a slot, 8, in the upper end of the arm, so that the rest or support may be adjusted vertically to suit the convenience of the user. I prefer, also, to make the rest adjustable relative to the length of the seat, and this may be done in different ways. I have shown it accomplished by means of a slot, 9, in the lower end of the arm, through which the bolts 6 pass, and it will be seen that by loosening the bolts the back may be adjusted in a horizontal plane when desired.

The advantages of my back support or rest for a bicycle-seat will be readily understood by users of the machine.

Instead of folding the rest down upon the seat, as shown, it might be arranged to be folded down behind the seat, if desired.

I am aware that various forms of seats have been provided with hinged back-rests, and do not claim, broadly, a seat having a hinged back-rest.

I claim as my invention—

In combination with the frame and an ordinary seat of a bicycle, an arm secured at one end to the frame under the seat and extending upwardly at the back of the seat, and a back-rest located behind the seat and having hinge-connection with the arm above the top of the seat, whereby it is adapted to be folded down, substantially as set forth.

CATHERINE A. WILLIAMSON.

In presence of—
 GEO. H. KNIGHT,
 JAS. WAHLE.